(12) United States Patent
Ely et al.

(10) Patent No.: US 11,088,718 B2
(45) Date of Patent: Aug. 10, 2021

(54) MULTI-COLORED CERAMIC HOUSINGS FOR AN ELECTRONIC DEVICE

(71) Applicant: Apple Inc., Cupertino, CA (US)

(72) Inventors: Colin M. Ely, Cupertino, CA (US); Dale N. Memering, Cupertino, CA (US); Kazuya Takagi, Tokyo-to (JP); Naoto Matsuyuki, Tokoyo-to (JP); Theodore A. Waniuk, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 670 days.

(21) Appl. No.: 15/371,121

(22) Filed: Dec. 6, 2016

(65) Prior Publication Data

US 2018/0070463 A1    Mar. 8, 2018

Related U.S. Application Data

(60) Provisional application No. 62/384,131, filed on Sep. 6, 2016.

(51) Int. Cl.
*C04B 35/00* (2006.01)
*H04B 1/3888* (2015.01)
(Continued)

(52) U.S. Cl.
CPC .......... *H04B 1/3888* (2013.01); *B28B 11/001* (2013.01); *B28B 11/045* (2013.01);
(Continued)

(58) Field of Classification Search
CPC ............... B28B 11/045; C04B 41/4572; C04B 2111/82; H04B 1/3888
(Continued)

(56) References Cited

U.S. PATENT DOCUMENTS

| 4,764,491 A | 8/1988 | Quadir |
| 4,833,001 A | 5/1989 | Kijima et al. |

(Continued)

FOREIGN PATENT DOCUMENTS

| CN | 105622096 | 6/2016 |
| EP | 0826645 | 3/1998 |

(Continued)

OTHER PUBLICATIONS

Siqueira et al., "Poly(borosiloxanes) as Precursors for Carbon Fiber Ceramic Matrix Composites," http://www.scielo.br/scielo.php?script=sci_arttext&pid=S1516-14392007000200009, Materials Research, vol. 10, No. 2, São Carlos, Apr./Jun. 2007.

(Continued)

*Primary Examiner* — Lee E Sanderson
*Assistant Examiner* — Michael C Romanowski
(74) *Attorney, Agent, or Firm* — Dorsey & Whitney LLP (57) ABSTRACT

A method of manufacturing a housing of an electronic device includes applying a mask to a portion of a ceramic green body to define a masked portion and an unmasked portion, applying a pigment to the ceramic green body to color the unmasked portion, and sintering the ceramic green body to remove the mask and form a ceramic housing. The ceramic housing may comprise a first portion corresponding to the masked portion and having a first color, and a second portion corresponding to the unmasked portion and having a second color different from the first color.

8 Claims, 8 Drawing Sheets

(51) Int. Cl.
*H05K 5/00* (2006.01)
*H05K 5/02* (2006.01)
*B28B 11/00* (2006.01)
*B28B 11/24* (2006.01)
*B28B 11/04* (2006.01)
*C04B 41/81* (2006.01)
*C04B 41/00* (2006.01)
*C04B 41/45* (2006.01)
*C04B 35/48* (2006.01)
*C04B 35/626* (2006.01)
*C04B 35/63* (2006.01)
*C04B 35/64* (2006.01)
*C04B 111/82* (2006.01)

(52) U.S. Cl.
CPC .......... *B28B 11/243* (2013.01); *C04B 41/009* (2013.01); *C04B 41/4572* (2013.01); *C04B 41/81* (2013.01); *C04B 2111/82* (2013.01)

(58) Field of Classification Search
USPC ............................................. 501/17; 428/34.4
See application file for complete search history.

(56) References Cited

U.S. PATENT DOCUMENTS

| | | | |
|---|---|---|---|
| 4,857,093 A | 8/1989 | Prewo et al. | |
| 5,935,515 A * | 8/1999 | Hesse | B44C 1/26 264/642 |
| 6,133,181 A | 10/2000 | Wentworth et al. | |
| 8,076,011 B2 | 12/2011 | Chiang et al. | |
| 8,251,210 B2 | 8/2012 | Schmidt et al. | |
| 8,298,975 B2 | 10/2012 | Hasegawa et al. | |
| 8,322,560 B2 | 12/2012 | Jiang et al. | |
| 8,394,167 B2 | 3/2013 | Merkel et al. | |
| 8,442,604 B1 | 5/2013 | Diebel | |
| 8,563,644 B2 | 10/2013 | Imada et al. | |
| 8,781,109 B2 | 7/2014 | Hong | |
| 9,007,747 B2 | 4/2015 | Gandhi | |
| 9,011,997 B2 | 4/2015 | Weber | |
| 9,448,713 B2 | 9/2016 | Cruz-Hernandez et al. | |
| 9,516,150 B2 | 12/2016 | Jeon et al. | |
| 2008/0026207 A1* | 1/2008 | Fink-Petri | C09C 1/66 428/328 |
| 2009/0197048 A1 | 8/2009 | Amin et al. | |
| 2010/0003479 A1 | 1/2010 | Hwang et al. | |
| 2013/0108813 A1 | 5/2013 | Zhu | |
| 2013/0221554 A1* | 8/2013 | Jung | B32B 18/00 264/16 |
| 2013/0224454 A1 | 8/2013 | Jung et al. | |
| 2013/0316116 A1 | 11/2013 | Adams et al. | |
| 2014/0004302 A1* | 1/2014 | Miwa | C04B 41/009 428/141 |
| 2014/0178642 A1 | 6/2014 | Milanovska et al. | |
| 2015/0010721 A1 | 1/2015 | Tanida et al. | |
| 2015/0246459 A1 | 9/2015 | Dorn et al. | |
| 2015/0307405 A1* | 10/2015 | Huguet | C04B 35/64 368/280 |
| 2015/0307406 A1* | 10/2015 | Pujol | G04B 37/226 368/280 |
| 2016/0089811 A1 | 3/2016 | Matsuyuki et al. | |
| 2016/0090326 A1 | 3/2016 | Matsuyuki et al. | |
| 2016/0255929 A1 | 9/2016 | Nazzaro et al. | |
| 2016/0347666 A1* | 12/2016 | Nagayama | C04B 35/488 |
| 2016/0347674 A1 | 12/2016 | Meschke et al. | |
| 2017/0075039 A1 | 3/2017 | Hart et al. | |
| 2017/0088473 A1 | 3/2017 | Wilson et al. | |
| 2017/0157645 A1* | 6/2017 | Wolz | A61C 8/0012 |
| 2017/0300114 A1 | 10/2017 | Matsuyuki et al. | |
| 2017/0361067 A1 | 12/2017 | Nazzaro et al. | |

FOREIGN PATENT DOCUMENTS

| | | |
|---|---|---|
| EP | 1857428 | 11/2007 |
| EP | 2243756 | 10/2010 |
| EP | 2266934 | 12/2010 |
| WO | WO 16/043378 | 3/2016 |

OTHER PUBLICATIONS

U.S. Appl. No. 15/611,329, filed Jun. 1, 2017, Ely et al.
U.S. Appl. No. 15/614,747, filed Jun. 6, 2017, Matsuyuki et al.
U.S. Appl. No. 15/098,836, filed Apr. 14, 2016, Matsuyuki et al.

* cited by examiner

MULTI-COLORED CERAMIC HOUSINGS FOR AN ELECTRONIC DEVICE

CROSS-REFERENCE TO RELATED APPLICATIONS

This application claims the benefit under 35 U.S.C. § 119(e) of U.S. Provisional Patent Application No. 62/384,131, filed on Sep. 6, 2016, and entitled "Multi-Colored Ceramic Housings for Electronic Device," the contents of which are incorporated by reference as if fully disclosed.

FIELD

The subject matter of this disclosure relates generally to ceramic housings for electronic devices, and more particularly to processes for forming multi-colored ceramic housings for electronic devices.

BACKGROUND

Ceramic components may include pigments mixed with ceramic materials to produce components of certain colors. For example, a ceramic powder may be mixed with a pigment powder. The powder mixture may be sintered to form a ceramic component having a color corresponding to the pigment (and/or a combination of the pigment and the ceramic powder). Different pigments may produce different colors.

SUMMARY

A housing for an electronic device includes a unitary housing component having a ceramic structure having a thickness and defining an exterior surface of the housing, a first pigment incorporated within a first portion of the ceramic structure, and a second pigment different from the first pigment incorporated within the first portion of the ceramic structure and a second portion of the ceramic structure.

The first portion of the ceramic structure may have a first color corresponding to the first pigment, and the second portion of the ceramic structure may have a second color corresponding to the second pigment. The first pigment may occlude the second pigment that is incorporated within the first portion of the ceramic structure to produce the first color.

The second pigment may be substantially uniformly distributed throughout the ceramic structure. The first pigment may be substantially uniformly distributed throughout the first portion of the ceramic structure. The first pigment may reach a depth in the first portion of the ceramic structure that is less than the thickness of the ceramic structure. The first pigment may have a first concentration in the first portion of the ceramic structure, and the first pigment may have a second concentration different from the first concentration in a third portion of the ceramic structure that is between the first and second portions of the ceramic structure.

A housing for an electronic device may include a housing component formed of a ceramic material with a first pigment embedded therein and including a colored portion defined by a region of the ceramic material having a first concentration of a second pigment, and a migration portion defined by a region of the ceramic material having a second concentration of the second pigment, the second concentration different than the first concentration. The second concentration may be lower than the first concentration. The first pigment may have a third concentration that is substantially uniform throughout the ceramic material.

In the migration portion, the second pigment may have a lower concentration at a surface of the ceramic material than at a depth within the ceramic material. The migration portion may have a color that corresponds substantially to a color of the first pigment. The migration portion may have a color that corresponds to a combination of the first pigment and the second pigment.

A method of manufacturing a housing of an electronic device includes mixing a ceramic material with a binder to form a ceramic slurry, molding the ceramic slurry into a ceramic green body having a shape corresponding to a housing of an electronic device, applying a mask to the ceramic green body to define a masked portion and an unmasked portion, applying a pigment to the ceramic green body to color the unmasked portion, and sintering the ceramic green body to form the housing. The ceramic material may include a zirconia powder.

The pigment may be a first pigment. The method may further include mixing a second pigment with the ceramic material and the binder to for the ceramic slurry. A first portion of the housing corresponding to the unmasked portion may include the first pigment and the second pigment, and a second portion of the housing corresponding to the masked portion may include the second pigment. The first portion of the housing may have a first color corresponding to the first pigment, and the second portion of the housing may have a second color corresponding to the second pigment.

The mask may substantially prevent the second pigment from penetrating through a surface of the ceramic green body. The method may further include, prior to applying the mask, removing at least some of the binder from the ceramic green body. The method may further include, prior to applying the mask, at least partially debinding the ceramic green body to increase a porosity of the green body, and prior to sintering the green body, at least partially demasking the ceramic green body to remove at least a portion of the mask from the ceramic green body. Applying the pigment may include dipping the ceramic green body in a pigment bath while applying a vacuum to the ceramic green body.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Housings for electronic devices may be manufactured from various materials, such as metals, ceramics, plastics, or the like. Different materials may be colored or dyed in various ways to produce housings having desired colors. In the case of ceramic materials, dyes or other pigments may be added to a ceramic material prior to sintering to produce a component of a selected color. For example, a ceramic powder may be mixed with a pigment powder and formed into a green body component (an unsintered ceramic component) using a binder that holds the powder mixture in a desired shape. After debinding (e.g., removal of all or some of the binder) and sintering, the ceramic component may have a color corresponding to the powdered pigment. A housing formed according to this process may have a single color.

Described herein are techniques for forming a ceramic component, such as a housing for an electronic device, that has multiple colors. For example, a green body comprising a ceramic material, a first pigment, and a binder may be formed and then subjected to a debinding process in which at least some of the binder is removed (e.g., by heating the green body until the binder disintegrates). The debinding process leaves voids or cavities in the green body, thus producing a porous structure. A mask is applied to the green body to seal areas of the now porous surface of the green body, and the masked green body is immersed in a second pigment solution, allowing the second pigment to permeate or soak into the voids in the green body through the unmasked surfaces.

Once the mask is removed and the green body is sintered, the resulting ceramic component may have two different portions or areas each with a different color. In particular, the area that was masked may have a color corresponding to the first pigment (e.g., the pigment that was mixed with the ceramic powder to form the green body), and the area that was unmasked may have a color corresponding to the second pigment, or a combination of the two pigments.

This process may produce different colored areas with distinct borders or boundaries therebetween. In particular, the mask may prevent or limit the pigment solution from permeating into the portions of the green body that are covered with the mask, thus producing a distinct boundary between the pigments in the component. Moreover, the structure of the ceramic material (e.g., the size and structure of the pores or voids in the green body) and the properties of the pigment solution (e.g., viscosity, surface tension, density) may prevent the second pigment from migrating throughout the entire structure of the green body. Rather, the second pigment may penetrate substantially only into the areas of the ceramic material beneath the unmasked areas. Accordingly, various patterns and shapes having distinct borders or boundaries may be produced.

The coloring processes described herein produce colors that are integrated with (e.g., are within) the ceramic material, and are not merely layered on top of the ceramic material. Accordingly, the exterior surface of a component formed via the described coloring processes is the ceramic material itself, and is not a paint or other coating which may have properties that are less desirable than those of the ceramic material. For example, as compared to the ceramic material, a paint or glaze may be less scratch resistant, softer, prone to chipping or flaking, or the like. Because the exterior surface is ceramic, and not a paint or glaze or other such coating or exterior layer having a different composition than the ceramic material, the superior or more desirable properties of the ceramic material are achieved.

Moreover, because the pigment is embedded within the ceramic material, the components can be machined or otherwise processed after forming without substantially changing the colors. That is, the pigment penetrates sufficiently deep into the ceramic material that machining or polishing operations do not remove all of the pigment. Thus, whereas a distinct paint or coating layer may be damaged or removed during polishing or machining, the colors produced by the presently disclosed coloring processes may remain substantially unchanged even after machining and/or polishing.

Figure 1:
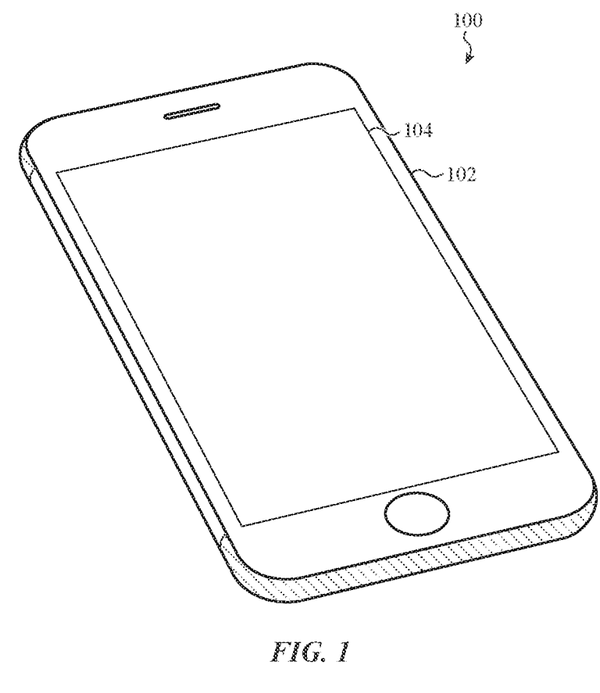
FIG. 1 shows an example electronic device.

FIG. 1 shows an example device 100. The device 100 shown in FIG. 1 is a mobile phone (e.g., a smartphone), but this is merely one representative example of a device that may be used in conjunction with the ideas disclosed herein. Other example devices include, without limitation, music/media players, tablet computers, laptop computers, wearable electronic devices, watches (e.g., mechanical, electrical, or electromechanical), and the like. Moreover, while the ideas disclosed herein are primarily described with reference to a ceramic housing for a device (e.g., an electronic device), the ideas are also applicable to ceramic components other than device housings.

The electronic device 100 includes a housing 102 and a cover 104, such as a glass, plastic, or other substantially transparent material, component, or assembly, attached to the housing 102. The cover 104 may cover or otherwise overlie a display and/or a touch sensitive surface (e.g., a touchscreen). The device 100 may also include internal components, such as processors, memory, processors, circuit boards, batteries, sensors, and the like. Such components may be disposed within an internal volume defined at least partially by the housing 102.

Figure 2:
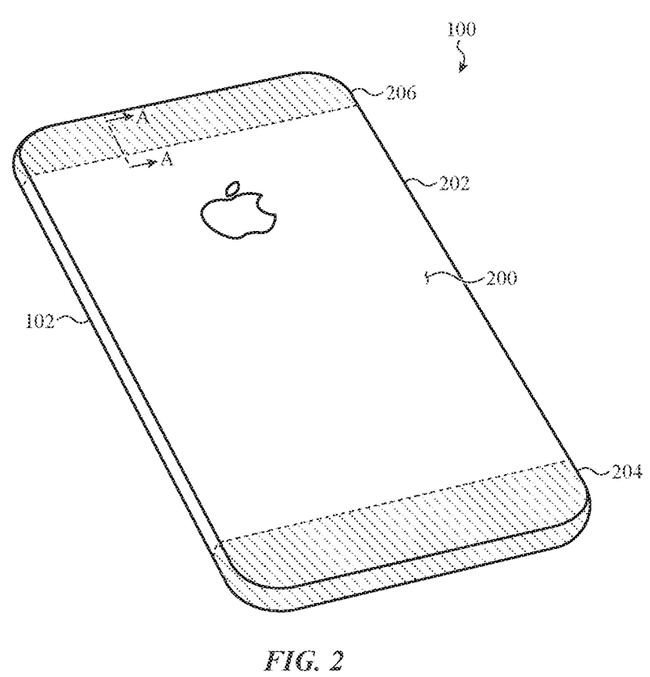
FIG. 2 shows a housing of the electronic device of FIG. 1.

The housing 102 may be formed from or include a ceramic material, such as zirconia, alumina, silicon carbide, yttria, silicon nitride, or the like. For example, the housing 102 may be or may include a ceramic component that defines at least one wall 200 of the housing 102, as shown in FIG. 2. The housing 102 may be a single unitary component (e.g., a single monolithic ceramic structure). In other cases, the housing 102 may be formed from multiple components (e.g., multiple unitary housing structures), such as multiple components fused, bonded, sintered, or otherwise attached to each other.

As noted above, the housing 102 may have different areas having different colors. In particular, a unitary ceramic housing component (e.g., a unitary, sintered ceramic structure) that forms part or all of the housing 102 may have a first portion that is a first color and a second portion that is a second color. The pigments that produce the colors may be contained within the structure of the ceramic material, such as within the pores or cavities left behind after a binder or adhesive is removed from a green body of the housing. Accordingly, the ceramic material, and not a paint or coating, forms an exterior surface of the housing 102.

FIG. 2 shows a back view of the housing 102, which may be a unitary (e.g., monolithic) ceramic housing component. The housing 102 may include a wall 200 defining an exterior surface (e.g., a back) of the housing 102. The wall 200 may have multiple portions having different colors. For example, the wall 200 has a first portion 202 having a first color, and second portions 204, 206 having a second color that is different from the first color.

The first portion 202 may have a first color that is defined or produced by a first pigment, such as a pigment that was incorporated with a ceramic powder to produce the green body ceramic component. The second portions 204, 206 may have a second color that is defined or produced by a second pigment in combination with the first pigment. For example, the entire housing 102 may include the first pigment. Accordingly, the second pigment, which is added to some portions of the housing to form a different color, is mixed with the first pigment to produce the second color.

For example, during production of the housing 102, the first portion 202 may be masked and the housing 102 may be immersed in a pigment bath having a second pigment to further color the housing 102. The second pigment may be absorbed into the housing 102 through the unmasked second portions 204, 206. Accordingly, the second portions 204, 206, which include both the first and second pigments, will have a different color than the first portion 202.

The color of the second portions 204, 206 may appear as a combination of the first and second pigments. For example, if the first pigment has a yellow color and the second pigment has a green color, the color of the second portions 204, 206 may be a blue color. In some cases, the second pigment may have a greater opacity or be substantially darker than the color of the second portions 204, 206. In such cases, the second portions 204, 206 may substantially correspond to the color of the second pigment, as the first color may be overpowered, occluded, or otherwise concealed by the second color.

FIGS. 3A-3F show partial cross-sectional views of the wall 200 of the housing 102, viewed along line A-A in FIG. 2, at various stages of an example process for forming and coloring the housing. More particularly, these figures show a process that produces a multi-colored ceramic component.

Figure 3A:
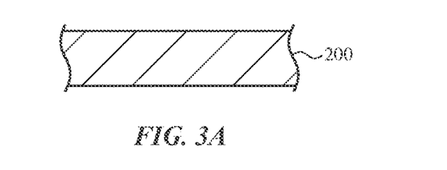
FIGS. 3A-3F show partial cross-sectional views of the housing of FIG. 2, viewed along line A-A in FIG. 2, at various stages of an example process for coloring the housing.

FIG. 3A shows a portion of the wall 200 (FIG. 2) after the ceramic green body corresponding to the housing is formed. For example, the wall 200 in FIG. 3A may be a ceramic powder and optional pigment (e.g., a first pigment) held in a shape corresponding to the housing 102 by a binder. The binder may be any suitable material, such as a polymer, a resin, a starch, a wax, an organic binder, an inorganic binder, etc.

Figure 3B:
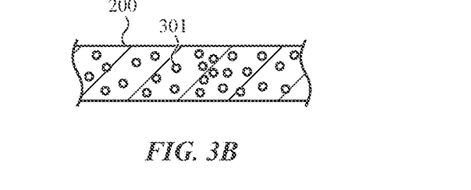

FIG. 3B shows the wall 200 after a debinding process in which at least some of the binder (and/or other materials or components of the green body) are removed, leaving pores or voids 301 in the ceramic material. The voids 301 in FIG. 3B are represented by circular or spherical voids, though this is merely a schematic depiction. The size, shape, and structure of the voids 301 may be different from those shown. Moreover, while the voids 301 are shown as completely sealed, they may be interconnected with other voids and may communicate with and/or be connected to the exterior environment. For example, the ceramic material may define an open cell structure, similar to an open cell foam or sponge. Thus, liquids and gasses, as well as sufficiently small solids, may be able to permeate or be absorbed into the wall 200 (e.g., into the voids 301) through a surface of the wall 200.

Figure 3C:
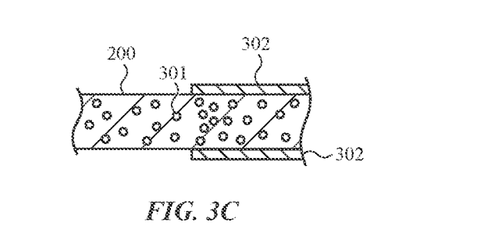

FIG. 3C shows the wall 200 after a mask 302 has been applied to the first portion 202 of the housing 102 (FIG. 2). The mask 302 is shown on both a top and bottom surface of the wall 200, though it may be applied to only one of the surfaces. For example, the mask 302 may be applied only to the surface that is to have different colored portions or areas (e.g., the exterior surface of the wall 200).

The mask 302 may be any appropriate material, such as a film, coating, epoxy, polymer (e.g., latex), or any other barrier layer that prevents or limits ingress of a liquid into the ceramic material. The mask 302 may sit on top of the wall 200 (as shown), or it may be absorbed at least partially into the ceramic material. Where the mask 302 is absorbed (e.g., at least partially absorbed) into the ceramic material, it may prevent or limit ingress of liquids by occupying or plugging the pores or voids 301 open to the surface of the wall 200. A mask 302 that is absorbed (e.g., at least partially absorbed) into the ceramic material may be removed during later processing stages (e.g., during sintering or a demasking process).

Figure 3D:
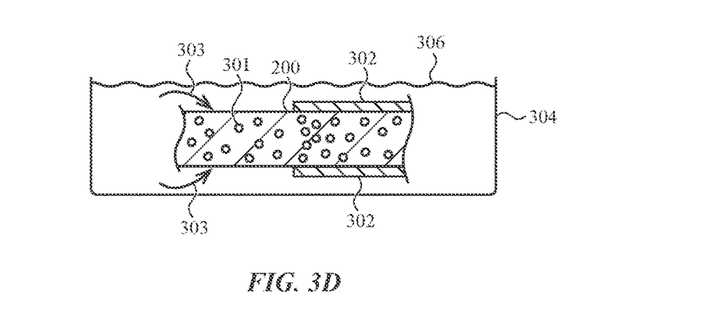

FIG. 3D shows the wall 200 submerged in a pigment bath 306 contained in a container 304. The pigment bath 306 may be any appropriate pigment or pigment solution, suspension, or the like. In some cases the pigment bath 306 is or includes a liquid, though this need not be the case. For example, the pigment bath 306 may be a gas or a vapor. The pigment bath 306 may be absorbed into the voids 301 defined by the ceramic structure through the unmasked portions of the wall 200 (as indicated by the arrows 303). The absorption of the pigment bath 306 may be accelerated or aided by performing the dipping process in a vacuum or other low-pressure (relative to ambient pressure) environment. In particular, the vacuum or low-pressure environment helps to draw the pigment bath 306 into the voids 301.

Figure 3E:
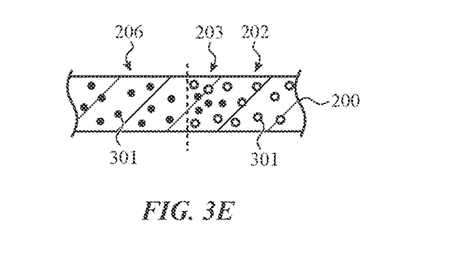

The pigment bath 306 may be absorbed into the voids 301 through the unmasked surface of the wall 200 while the mask 302 prevents the pigment bath 306 from being absorbed through the masked surface. While some of the pigment bath 306 may migrate into voids 301 that are below the mask 302 (as shown in FIG. 3E), this may not disrupt or affect the visual boundary between the colors. For example, pigment that is deeper within the wall 200 may be less visible than pigment near the surface of the wall 200. In some cases, pigment near the surface of the wall completely occludes pigment deeper within the wall, such that migration of pigment below a certain depth of the wall 200 is not visible. Accordingly, the migration of pigment within the wall 200 may not substantially disrupt the visually distinct boundary between the colors on the surface of the wall 200. For example, as shown in FIG. 3E, while some of the voids 301 in the first portion 202 of the housing have been colored by the pigment bath 306, these voids may not affect the border between the colors of the first and second portions 202, 206.

FIG. 3E shows the wall 200 after the housing 102 has been removed from the pigment bath 306 and the mask 302 has been removed. The voids 301 in the first portion 202 of the housing 102 remain substantially free of the second pigment (from the pigment bath 306), while the voids 301 in the second portion 206 of the housing 102 are filled (or at least partially filled) with the second pigment. The wall 200 also includes a third portion 203 (e.g., a migration portion) where the pigment bath 306 has migrated into voids below the mask 302. As described above, in third or migration portion 203, the pigment bath 306 may have a lower concentration near the surfaces of the wall 200 than at a depth within the wall 200. In particular, because the mask 302 substantially prevents the pigment bath 306 from entering through the surface of the wall 200, the migration of the pigment bath 306 may occur primarily within the thickness of the wall 200, such as near the middle of the thickness of the wall 200.

While FIG. 3E shows all of the voids 301 in the second portion 206 uniformly filled with the second pigment, this may not be the case. For example, in some cases, the pigment may not penetrate through the complete thickness of the wall 200, and may instead be concentrated or located proximate the unmasked surfaces. The depth of penetration of the pigment in the second portion 206 may depend on various factors, such as the size of the voids 301, the density, surface tension, or viscosity of the pigment bath 306, the length of time the housing 102 is in the pigment bath 306, and the like. Any of these (or other parameters) may be selected or tuned to provide a desired depth of penetration of the pigment bath 306 into the housing 102.

After sintering, the first and second pigments may be integrated with the ceramic structure. For example, as noted above, the first pigment may have been mixed with a ceramic powder to form the ceramic green body, and thus the first pigment may be distributed throughout the ceramic structure. For example, the first pigment may be distributed substantially uniformly and/or homogenously throughout the ceramic material. Similarly, because the second pigment is absorbed into the ceramic structure, the second pigment may be distributed throughout a portion of the ceramic structure. In some cases, the pigment is absorbed to a depth below an exterior surface of the ceramic structure that is less than a complete thickness of the ceramic structure or wall (e.g., to a depth of about 0.1 mm, 0.2 mm, 0.5 mm, 1.0 mm, or 2.0 mm).

Figure 3F:
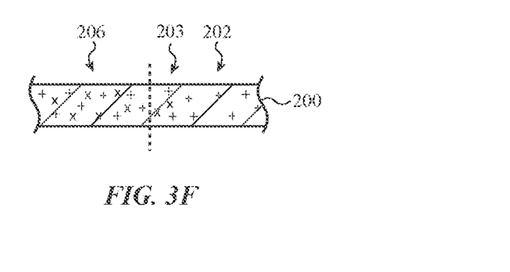

FIG. 3F illustrates the wall 200 after the housing 102 has been sintered, showing the integration of the first pigment (represented by plus signs) within the ceramic structure of the wall 200, as well as the integration of the second pigment (represented by x's) within the ceramic structure. (The wall 200 in FIG. 3F is slightly thinner than the wall 200 in FIGS. 3A-3E, illustrating shrinkage of the green body ceramic material that may occur during sintering.) The first and second pigments may be integrated within the ceramic structure by becoming integrated with the crystalline structures of the sintered ceramic material (e.g., at the atomic level), or the pigments may be distributed as interstitial particles in the ceramic matrix, or a combination of these and/or other mechanisms and structures.

As illustrated in FIG. 3F, the first and second pigments may have different concentrations in the different portions of the wall 200. For example, the second portion 206 may have a first concentration of the second pigment, while the third portion 203 (e.g., a migration portion) may have a second concentration of the second pigment. The second concentration of the second pigment may be lower than the first concentration. For example, because the second pigment may only enter the third portion 203 due to migration of the pigment bath through the ceramic structure (and not through a surface of the wall 200), less of the second pigment (e.g., per unit volume of ceramic material) may be present in the third portion as compared to the second portion 206. In some cases, the color of the third or migration portion 203 corresponds to the color of the first pigment, such as where the first pigment occludes, overpowers, or otherwise dominates over the color of the second pigment. In other cases, the color of the third or migration portion 203 corresponds to the second pigment (e.g., where the first pigment is absent and/or the pigment and the ceramic material are transparent or light-transmissive) or a combination of the first and second pigments (e.g., a blend of the colors of the first and second pigments). 3640

The concentrations of the pigments may be formulated as per-unit-volume or per-unit-mass values relative to the ceramic material of the relevant portion. Other concentration formulations may also be used.

FIGS. 3A-3F illustrate forming a housing 102 that has straight borders between the different colored portions of the housing 102. However, the masking and dipping process described herein may also be used to produce more complex or detailed designs. FIGS. 4A-4E, for example, illustrate a housing 402 (which may be similar to the housing 102) at various stages of a coloring process where a shape corresponding to a logo is masked to produce a housing with a contrasting color logo.

Figure 4A:
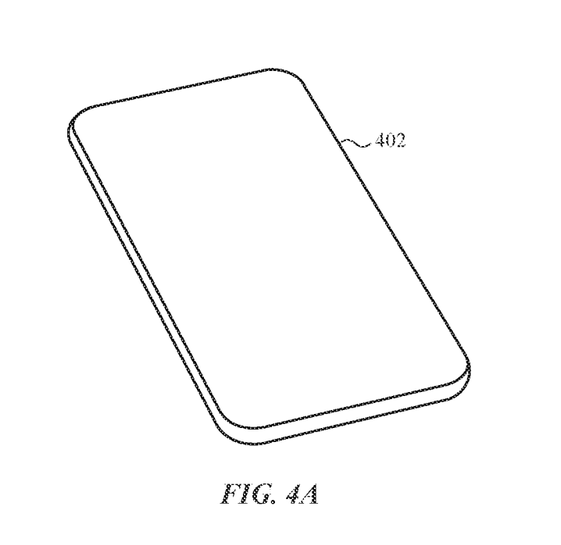
FIGS. 4A-4B show an example housing at various stages of an example process for coloring the housing.

FIG. 4A shows the housing 402, which may be an unsintered ceramic structure (e.g., a green body), that may or may not have a pigment incorporated therein. The housing 402 may include or define voids or pores therein, similar to the voids 301, described above.

Figure 4B:
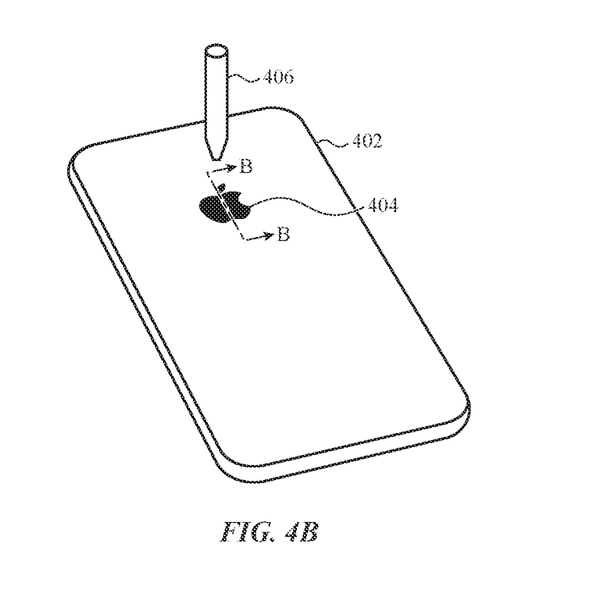

FIG. 4B shows a mask 404 being applied to the housing 402 via a deposition mechanism 406 (e.g., a nozzle, print head, or the like), using a process that may be similar to an ink jet or other printer. The mask 404 in FIG. 4B corresponds to a logo, but it may be any shape, text, or design that is to have a different color from the surrounding areas of the housing 402. The mask 404 may be any suitable material, as described above. Moreover, while FIG. 4B shows the mask 404 being applied from the mechanism 406, this is merely one example. The mask 404 may be applied in other ways, such as by applying a film in the shape of the logo to the housing 402, or brushing a paint, sealant, epoxy, or other coating or material on the housing 402.

Figure 4C:
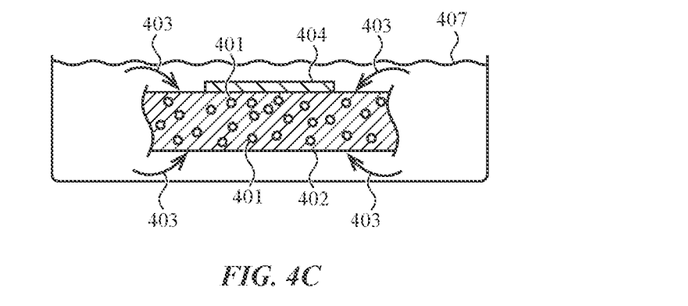
FIG. 4C shows a partial cross-sectional view of the housing of FIGS. 4A and 4B, viewed along line B-B in FIG. 4B, at a stage of an example process for coloring the housing.

FIG. 4C shows a partial cross-sectional view of the housing 402, viewed along line B-B in FIG. 4B, while the housing 402 is in a pigment bath 407 (similar to the pigment bath 306, FIG. 3D). The pigment bath 407 may be absorbed into the voids 401 defined by the ceramic structure through the unmasked surfaces of the housing 402 (as indicated by the arrows 403).

Figure 4D:
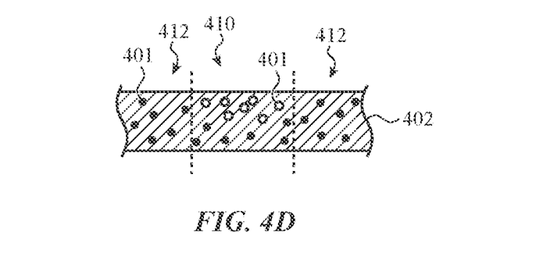
FIGS. 4D-4E show the housing of FIGS. 4A-4B after the coloring process.
Figure 4E:
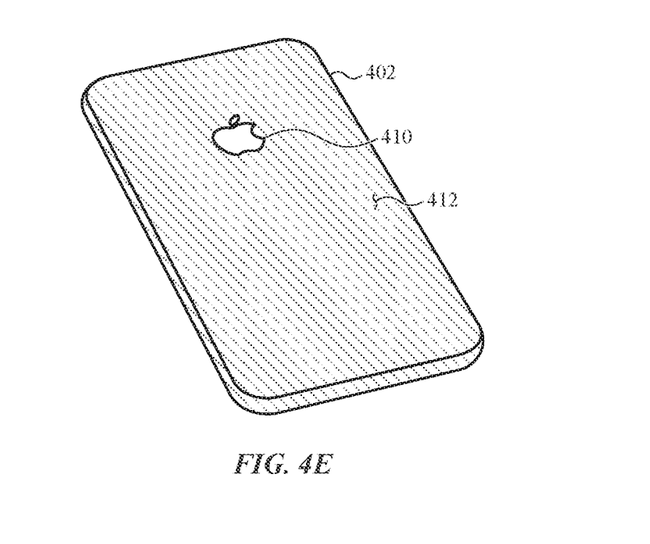

FIG. 4D shows a partial cross-sectional view of the housing 402, viewed along line B-B in FIG. 4B, after the housing 402 is removed from the pigment bah 407 and the mask 404 is removed. FIG. 4E shows a back view of the housing 402 after the housing 402 is removed from the pigment bah 407 and the mask 404 is removed. As shown in FIGS. 4D-4E, the area corresponding to the logo 410 remains uncolored by the pigment in the pigment bath 407 and retains the color corresponding to the ceramic material itself (and/or the pigment that was mixed with the ceramic material that was formed into the green body). On the other hand, the portions 412 of the housing 402 that were not masked have been colored by the pigment bath 407, resulting in a housing 402 with a logo 410 having a different color than a surrounding area of the housing 402.

While FIGS. 2-4D illustrate certain portions of the housings being masked, and others remaining unmasked, these are merely examples of the locations, shapes, and sizes of the masked and/or unmasked portions. For example, the logo 410 (and thus the corresponding mask 404) may be any other shapes, logos, designs, or the like. Further, instead of masking the logo 410, a mask defining an opening that corresponds to the logo 410 may be applied, such that the pigment bath 407 penetrates into the opening to color the logo 410 and the remaining portions 412 of the housing 402 are uncolored by the pigment bath 407. Similarly, with reference to FIG. 2, instead of masking the first portion 202 of the housing 102 (FIGS. 2-3F), the second portions 204, 206 of the housing 102 may be masked so that the first portion 202 is colored by the second pigment.

Figure 5A:
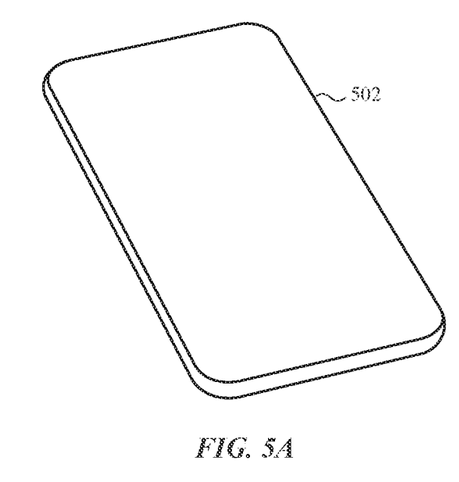
FIGS. 5A-5B show an example housing at various stages of an example process for coloring the housing.
Figure 5B:
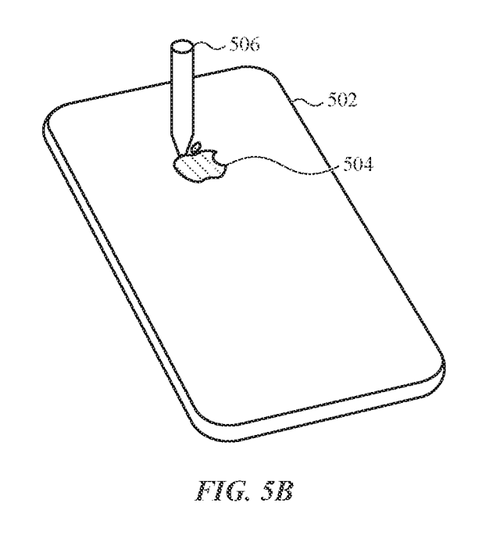

FIGS. 5A-5B illustrate a housing 502 (which may be similar to the housing 102 described above) at various stages of a coloring process where a pigment is deposited onto the housing 502. Unlike the dipping process described with respect to FIGS. 3A-4D, the coloring process in FIGS. 5A-5B includes applying a pigment to selected portions of an unsintered ceramic structure such that the pigment penetrates into the pores or voids of the ceramic structure. In this process, masking and pigment bath operations may be omitted.

FIG. 5A shows the housing 502, which may be an unsintered ceramic structure (e.g., a green body), that may or may not have a pigment incorporated therein. In particular, the housing 502 may be formed from a mixture of a ceramic powder and a pigment. The housing 502 may include or define voids or pores therein, similar to the voids 301, described above.

FIG. 5B shows a pigment being applied to the housing 502 to form a design 504 (e.g., a logo, lettering, or any other suitable design). The pigment is shown being applied by a deposition mechanism 506 (e.g., a nozzle, print head, or the like), using a process similar to ink jet or other printing processes. In various embodiments, other techniques or apparatuses are used to apply the pigment, such as brushing, spraying, vapor deposition, or the like. Applying the pigment using the deposition mechanism 506 may be sufficiently precise that no masking is necessary to form a distinct boundary or border between the different colored portions (e.g., between the design 504 and surrounding areas). Moreover, the pigment may penetrate into the voids in the housing 502 without substantially migrating into surrounding areas, thus defining a distinct border between the applied pigment and surrounding areas.

After the pigment is applied, the housing 502 may be further processed, including sintering and machining and/or polishing. Because the pigment is applied to the housing 502 in the green body state, the pigment may penetrate sufficiently far into the ceramic structure that the post-sintering operations such as machining and/or polishing will not remove the design 504 from the housing 502. For example, the pigment may be integrated with the structure of the ceramic material as describe above with respect to FIG. 3F.

Figure 6:
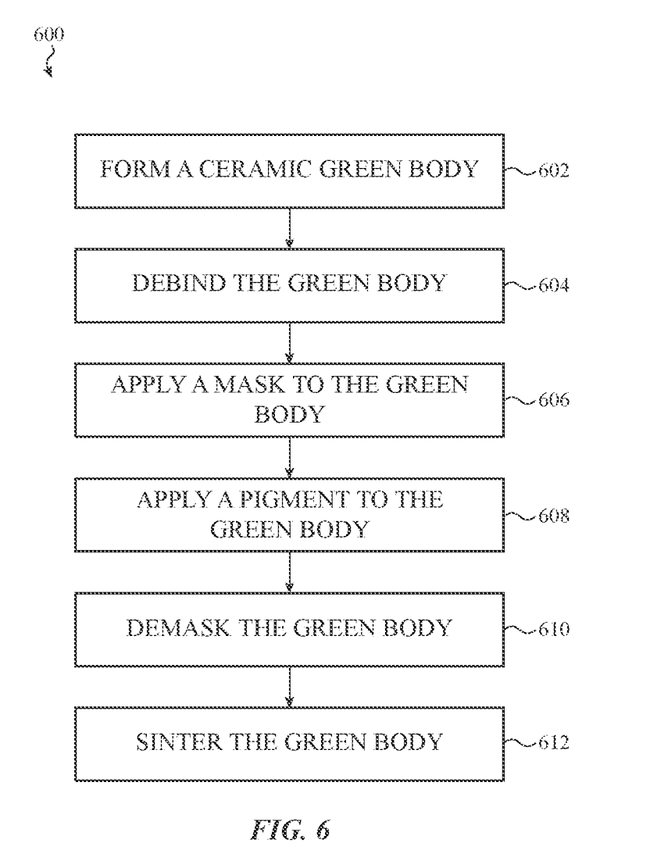
FIG. 6 shows an example process of coloring a housing.

FIG. 6 shows an example process 600 of manufacturing an example housing, such as the housing 102, FIG. 1 (or the housing 402, FIG. 4A). The process 600 may be used to produce a unitary ceramic housing component that has portions having different colors, where the colors are embedded in or integrated with the ceramic structure. While the process 600 describes certain operations, not all operations are necessarily required in all embodiments. For example, some of the described operations may be omitted and other operations may be added in various embodiments. Moreover, the operations may be reordered in various embodiments.

At operation 602, a ceramic green body component is formed. Forming the ceramic green body may include forming a ceramic slurry comprising a ceramic powder, a binder, and optionally a pigment. The ceramic powder may be or may include any appropriate ceramic material, such as zirconia, alumina, yttria, silicon carbide, silicon nitride, or the like. The binder may be any suitable binder, such as an organic binder, an inorganic binder, a resin, a polymer, a starch, or the like. The optional pigment may be in any suitable form, such as a powder, a liquid, a suspension, or the like. The optional pigment may include various elements, compounds, or materials that impart a color to the pigment. Example materials include but are not limited to cobalt, aluminum, titanium, titanium dioxide, chromium, manganese, iron, iron oxide, copper, carbon, cadmium, and zinc.

The slurry may be mixed together (e.g., using a propeller mixer) and then formed into the ceramic green body by molding the slurry into a shape corresponding to the ceramic housing (or a component of the ceramic housing). For example, the slurry may be introduced into a mold cavity, and the binder may be at least partially cured (e.g., by heat or time) to form a solid component. The cured green body may not be the exact size or shape as the intended size of the housing, as the green body may shrink during subsequent processing steps (e.g., debinding and sintering).

At operation 604, the green body may be at least partially debound, where the binder is removed from the green body. At least partially debinding the green body may include heating the green body to a debinding temperature for a duration. For example, the green body may be heated in an environment (e.g., a furnace) having a temperature between about 500-1000° C. for any suitable duration (e.g., from about 30 minutes to about 2 hours). The debinding temperature may be any suitable temperature, and it may be the same as the temperature of the furnace, or a lower temperature. For example, the green body may be heated in a 500° C. furnace until the temperature of the green body reaches a debinding temperature that is less than 500° C. Alternatively, the green body may remain in a furnace that is set at the debinding temperature until the green body reaches the debinding temperature. The debinding temperature may depend on the duration of heating. For example, a lower debinding temperature may be used with a longer debinding duration, and a higher debinding temperature may be used with a shorter debinding duration.

The debinding process increases a porosity of the green body. In particular, the removal of the binder (or some of the binder) leaves voids, spaces, or pores within the ceramic structure of the green body where the binder had been. These voids (such as the voids 301, 401 described above) may absorb or otherwise allow the penetration of pigment into the ceramic structure.

In some cases, the green body is completely debound, such that none of the binder remains in the green body. In other cases, the green body is partially debound, so that while some binder remains in the green body, voids are also produced through at least a portion of the ceramic structure. Where the green body is only partially debound, the remaining binder may be removed during a later debinding step and/or during sintering.

Different areas of the green body may be debound differently. For example, one portion of the green body may be completely debound, while another portion may not be debound at all, or may only be partially debound. As another example, different portions of the green body may be partially debound to different degrees (e.g., a first portion may be approximately 25% debound, while a second portion may be approximately 75% debound).

Different degrees of debinding may result in different void or pore sizes, or different void or pore distributions through the ceramic structure, which may affect how the pigment and/or the mask is absorbed into the green body. Such variations may be exploited for various purposes. For example, by debinding different portions to different degrees (e.g., so that a different amount of binder is removed from the different portions), the amount of pigment that is absorbed may be varied, thus producing portions with different color, color density, saturation, opacity, or other properties.

At operation 606, a mask is applied to a portion of the green body to define a masked portion and an unmasked portion of the green body. The mask may be any suitable material that prevents or limits a pigment from passing through the mask and penetrating into the ceramic structure of the green body. For example, the mask may be a film (e.g., polyester, latex, etc.), a liquid that cures and/or dries to form a mask (e.g., a paint, epoxy, resin, etc.), or any other suitable material. Films may be adhered or otherwise bonded to the green body.

The mask may be applied in any suitable way. For example, where the mask is a film, the mask may be placed on the green body by hand or by a machine. Where the mask is a liquid, it may be applied by spraying, painting, dipping, printing, etc. As a specific example, a deposition mechanism, similar to a spray nozzle or printer head, may apply a liquid mask onto the green body.

The mask may have any suitable shape and may be applied to any suitable portion of the green body. For example, a middle portion of a housing may be masked, as shown above in FIG. 2. As another example, the mask may be a design, such as an image, text, a logo, or the like, as described above with respect to FIGS. 4A-4E. As noted, the edges of the mask may define or correspond to the border or boundary between different colors of the completed housing.

The mask may remain substantially on the surface of the green body, or it may penetrate at least partially into the voids defined by the ceramic structure. In the former case, the mask prevents pigment from entering the ceramic green body through the surface of the green body, but may allow some migration of pigment from the unmasked portion into the masked portion through the network of voids within the ceramic structure. In cases where the mask penetrates into the voids, the migration of pigment from the unmasked portion into the masked portion may be reduced, as the pores within the masked portion of the ceramic structure are occupied by the masking material.

A penetrating mask may not penetrate through a complete thickness of the ceramic structure. For example, if a wall of a housing is 1.0 mm thick, the mask may penetrate around 0.1 mm into the wall, which may prevent migration of the pigment into the masked portion at least for the top 0.1 mm of the ceramic. (Other penetration depths are also possible, such as about 0.2 mm, about 0.3 mm, and so forth.) Even if there is some migration of pigment below the mask, the border between the masked and unmasked portions on the surface of the housing may still be distinct. In particular, the opacity of the pigment or the material may be sufficient to occlude migrated pigments deeper than about 0.1 mm within the ceramic structure.

At operation 608, a pigment is applied to the green body to color at least a portion of the green body. Where the green body already includes a pigment (e.g., a first pigment that was mixed with the ceramic powder when forming the green body), the pigment applied at operation 608 (e.g., a second pigment) may have a different color than the first pigment. The second pigment may be applied in various ways. For example, the green body may be dipped or submerged in a pigment bath comprising the second pigment. The pigment bath may be a liquid, powder, suspension, solution, slurry, or any other material that can penetrate into the pores of the green body, but will not substantially penetrate through the mask. As another example, the pigment may be sprayed or painted or otherwise introduced onto a surface of the green body.

Where the second pigment is applied by at least partially submerging the green body in a pigment bath, a vacuum (or low pressure) may be applied to the green body and pigment bath. For example, the pigment bath and the green body may be placed in a vacuum chamber, and the pressure surrounding the pigment bath and the green body may be reduced. This may have the effect of drawing air out of the voids in the ceramic structure, thereby drawing the pigment bath into the voids.

When the second pigment is applied to the green body, the second pigment penetrates into the unmasked portion of the green body, thereby imparting the color of the second pigment to that portion of the green body. As noted above, the second pigment may not penetrate into the green body through the masked surface. Accordingly, the masked surface may remain substantially uncolored by the second pigment.

At operation 610, the green body is demasked. Demasking the green body may include peeling the mask away, burning or melting the mask away, dissolving the mask with a solvent, or any other suitable process. In some cases, such as where a penetrating mask is used, the process of demasking the green body may be similar to debinding the green body. For example, the masked green body may be placed into a furnace and heated to a demasking temperature (e.g., between about 500° C. and about 1000° C., or any other appropriate temperature) for a suitable duration to remove the mask.

At operation 612, the green body is sintered to form a ceramic housing. Sintering the green body may include heating the green body in a furnace at a sintering temperature for a sintering duration. The sintering temperature and duration may be selected based at least in part on the composition of the ceramic material, strength targets, dimensional stability targets, etc. In some cases, the sintering temperature is about 1400° C. or greater, and the sintering duration is about 1 hour or more. Other sintering temperatures and durations are also possible. Sintering causes the powdered ceramic material to bond or fuse together to form a unitary (e.g., monolithic) ceramic structure, such as a monocrystalline or polycrystalline ceramic structure. More particularly, the ceramic structure may be a polycrystalline structure comprising multiple grains of monocrystalline ceramic structures. Or, the ceramic structure may be a single crystal (or substantially a single crystal) of the ceramic material.

During sintering, the pigments (e.g., the second pigment from the pigment bath and the optional first pigment in the slurry) dopes into the crystalline structure of the ceramic material (or is otherwise integrated or incorporated within the ceramic structure), thus imparting a color to the ceramic material. Notably, the pigments may not simply coat an outer surface of the ceramic material, like a paint or glaze would. Rather, the exterior surface of the housing is the ceramic material itself, and the color is embedded or integrated with the ceramic material. In this way, the exterior surface has the properties of the ceramic material (e.g., hardness, scratch resistance, appearance, and the like) instead of the properties of a coating layer like a paint or glaze.

In some cases, the demasking operation 610 is performed during the sintering operation 612. In particular, after application of the second pigment (operation 608), the masked green body may be placed into a sintering furnace and heated at a sintering temperature for a sintering duration.

The process of sintering the green body in the sintering furnace may cause the mask (and any remaining binder) to burn away, melt, vaporize, or otherwise be removed from the green body, in addition to fusing the ceramic material.

In the process described above, the ceramic green body is subjected to one pigment bath. In some cases, additional pigment baths may be used. For example, after debinding the green body (operation 604) and before masking the green body (operation 606), the green body may be subjected to a first pigment bath to apply a pigment to the entire green body. After the first pigment bath, the green body may be masked and placed in a second pigment bath to apply a second pigment to the unmasked portions (e.g., operations 606, 608). The green body may then be demasked and sintered as described above.

A green body may be masked before any of the pigment baths. For example, after debinding, the green body may be masked (e.g., with a first mask) and then placed in a first pigment bath. After the pigment has sufficiently penetrated the green body, the first mask may then be removed and a second mask may be applied. The green body with the second mask may then be placed in a second pigment bath. The masking and pigment baths may be repeated multiple times in order to achieve a desired result. More particularly, multiple masking and coloring processes may be used to form housings with as many as three, four, or more different regions or designs having different colors.

Figure 7:
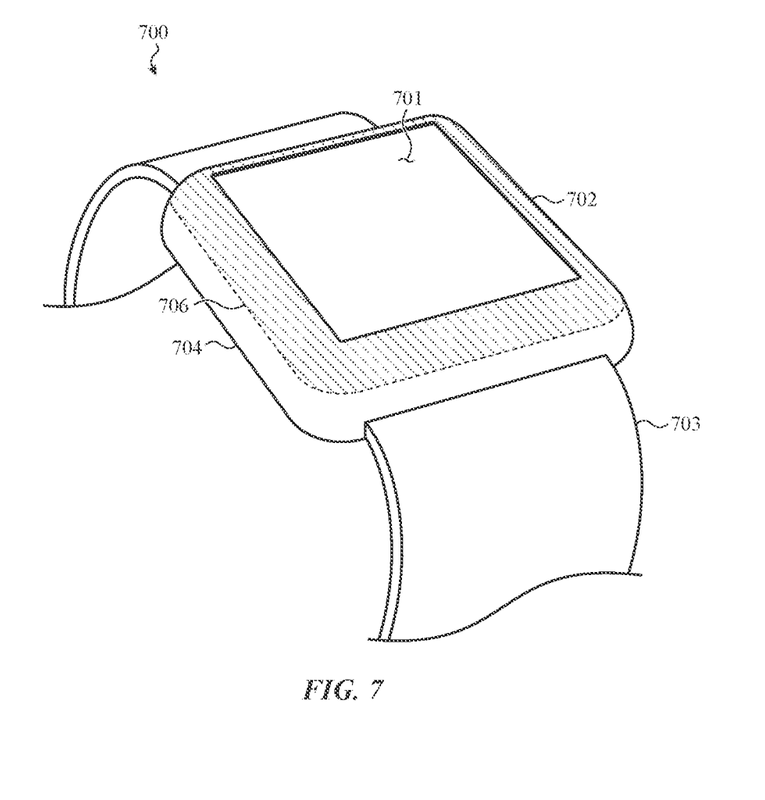
FIG. 7 shows an example electronic device having a multi-colored ceramic housing.

The foregoing description and figures describe the coloring process with respect to a housing of a mobile phone. However, it will be understood that the same process applies to other ceramic components and to other coloring patterns than those shown above. For example, FIG. 7 shows a wearable electronic device (e.g., a smartwatch 700) having a multi-colored ceramic housing 702. The smartwatch 700 (or other wearable electronic device) may also include internal components, such as processors, memory, processors, circuit boards, batteries, sensors, and the like. Such components may be disposed within an internal volume defined at least partially by the ceramic housing 702. The smart watch may further include a display 701 (e.g., a touch-sensitive display) coupled to the ceramic housing 702, and a band 703 coupled to the housing 702 for attaching the smartwatch 700 to a user.

The housing 702 may be formed from any suitable ceramic material using any suitable process, such as those described above. Moreover, the housing 702 may have different portions having different colors. The different colored areas may be formed in the same or similar manner described above.

In particular, the housing 702 has a first portion 704 having a first color, and a second portion 706 having a second color that is different from the first color. These differently colored areas may be formed by masking a green body that corresponds to the housing 702, and dipping the green body in a pigment bath, as described above. The unmasked portion will absorb the pigment from the pigment bath to achieve a different color than the unmasked portion. In FIG. 7, the second portion 706 is on the sidewalls of the housing 702 and forms a frame around the display 701. Other patterns or designs are also possible. For example, the back surface of the housing 702 (e.g., the side opposite the display 701) may be a first color, and the entirety of the sidewalls of the housing (e.g., the complete sidewall extending from the back surface of the housing to the display 701) may be a second color.

Either the first portion 704 or the second portion 706 may correspond to the masked portion, depending on the particular colors and/or pigments selected for the areas. For example, the first portion 704 may be masked to allow the second portion 706 to absorb the pigment from a pigment bath. Alternatively, the second portion 706 may be masked to allow the first portion 704 to absorb the pigment from the pigment bath. The masked portion may have the color of the raw ceramic material, or the color of a pigment that was included in the slurry when forming the green body. As noted above, the housing 702 may be subjected to multiple masking and coloring steps to produce various colors and designs.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. A housing for an electronic device, comprising:
a unitary housing component comprising:
a ceramic structure having an exterior portion, and an interior portion adjacent to the exterior portion, the exterior portion defining an exterior surface of the housing;
an unmasked region of the ceramic structure including a first section of the exterior portion and an adjacent section of the interior portion, the unmasked region comprising an absorbed pigment and an incorporated pigment, the incorporated pigment being different from the absorbed pigment; and
a masked region of the ceramic structure including a second section of the exterior portion having a thickness of at least 0.1 mm, the masked region comprising the incorporated pigment and being free of the absorbed pigment, the masked region being adjacent to the unmasked region along an interface;
the unmasked region comprising:
a first location at the exterior surface having a first porosity defined by pores in the ceramic structure, the pores at least partially filled with the absorbed pigment so that the first location has a first concentration of the absorbed pigment corresponding to the first porosity;
a second, different location at the exterior surface having a second, different porosity defined by pores, the pores at least partially filled with the absorbed pigment so that the second location has a second, different concentration of the absorbed pigment corresponding to the second porosity; and
a third location at the exterior surface between the first location and the second location having a transition porosity transitioning from the first porosity to the second porosity, a concentration of the absorbed pigment at the third location transitioning from the first concentration to the second concentration to define a gradient distribution of the absorbed pigment.

2. The housing of claim 1, wherein:
the unmasked region of the ceramic structure has a first color corresponding to the absorbed pigment; and
the masked region of the ceramic structure has a second color corresponding to the incorporated pigment.

3. The housing of claim 2, wherein the absorbed pigment occludes the incorporated pigment within the unmasked region to produce the first color.

4. The housing of claim 1, wherein the incorporated pigment is substantially uniformly distributed throughout the ceramic structure.

5. The housing of claim 4, wherein the absorbed pigment reaches a depth in the unmasked region that is less than a thickness of the ceramic structure.

6. The housing of claim 1, wherein:
the absorbed pigment has a third concentration at a location in the interior portion disposed under the masked region, the third concentration being different from the first concentration and the second concentration.

7. A housing for an electronic device, comprising:
a housing component formed of a ceramic material defining an exterior surface, and including an incorporated pigment embedded in the ceramic material, the housing component comprising:
a masked region defining a first area of the exterior surface having a color corresponding to the incorporated pigment;
an unmasked region comprising;
a first location at the exterior surface having a first porosity defined by pores in the ceramic material, the pores at least partially filled with an absorbed pigment so that the first location has a first concentration of the absorbed pigment corresponding to the first porosity;
a second, different location at the exterior surface having a second, different porosity defined by pores in the ceramic material, the pores at least partially filled with the absorbed pigment so that the second location has a second, different concentration of the absorbed pigment corresponding to the second porosity;
a third location at the exterior surface between the first location and the second location having a transition porosity transitioning from the first porosity to the second porosity, a concentration of the absorbed pigment at the third location transitioning from the first concentration to the second concentration to define a gradient distribution of the absorbed pigment, the unmasked region defining a second area of the exterior surface having a color corresponding to the absorbed pigment; and
a migration region having a third concentration of the absorbed pigment different than the first concentration and the second concentration, the migration region adjacent to the unmasked region and disposed at least 0.1 mm below the masked region.

8. The housing of claim 7, wherein the second concentration is lower than the first concentration, and the first location is closer to the masked region than the second location.

* * * * *